United States Patent [19]

Leibe et al.

[11] Patent Number: 4,905,236

[45] Date of Patent: Feb. 27, 1990

[54] CIRCUIT ARRANGEMENT FOR DESIGNATIONAL READING OF INFORMATION OF A BIT GROUP ORIENTED, CONTINUOUS INFORMATION STREAM AT AN ISDN-ORIENTED INTERFACE

[75] Inventors: Gerhard Leibe; Albert Weiss, both of Munich, Fed. Rep. of Germany

[73] Assignee: Siemens Aktiengesellschaft, Berlin and Munich, Fed. Rep. of Germany

[21] Appl. No.: 218,211

[22] Filed: Jul. 13, 1988

[30] Foreign Application Priority Data

Jul. 15, 1987 [DE] Fed. Rep. of Germany ....... 3723436

[51] Int. Cl.⁴ .............................................. H04J 3/02
[52] U.S. Cl. .................................. 370/110.1; 370/112
[58] Field of Search ................ 370/110.1, 13, 58, 112, 370/77

[56] References Cited

U.S. PATENT DOCUMENTS 4,797,654  1/1989  Young et al. ......................... 370/58
4,821,264  4/1989  Kim .................................. 370/110.1

OTHER PUBLICATIONS

Telcom Report 9 (1986) No. 4 pp. 230 to 234; "VLSI Chips for Basic Access in the IOM-Architecture".

Primary Examiner—Douglas W. Olms
Attorney, Agent, or Firm—Hill, Van Santen, Steadman & Simpson

[57] ABSTRACT

The reading times for a designational reading of information communicated via an ISDN-oriented interface are formed for a recording device and transmitted thereto with the assistance of a circuit arrangement, being formed from bit clock signals and bit group clock signals, which define the boundaries of the bit groups comprising 32 bits, that are present in an ISDN-oriented interface. The reading times present in the form of bit clock pulses inform the recording device of the times at which the information are to be read and subsequently stored. The circuit arrangement contains a shift register that is formed by a plurality of registers corresponding in number to the plurality of bits of a bit group, a reset device that is realized, for example, by an inverter and a switch, and also contains an AND gate and a plurality of switch devices whose setting determines which information are, respectively, bits of a bit group are to be read and stored.

18 Claims, 2 Drawing Sheets

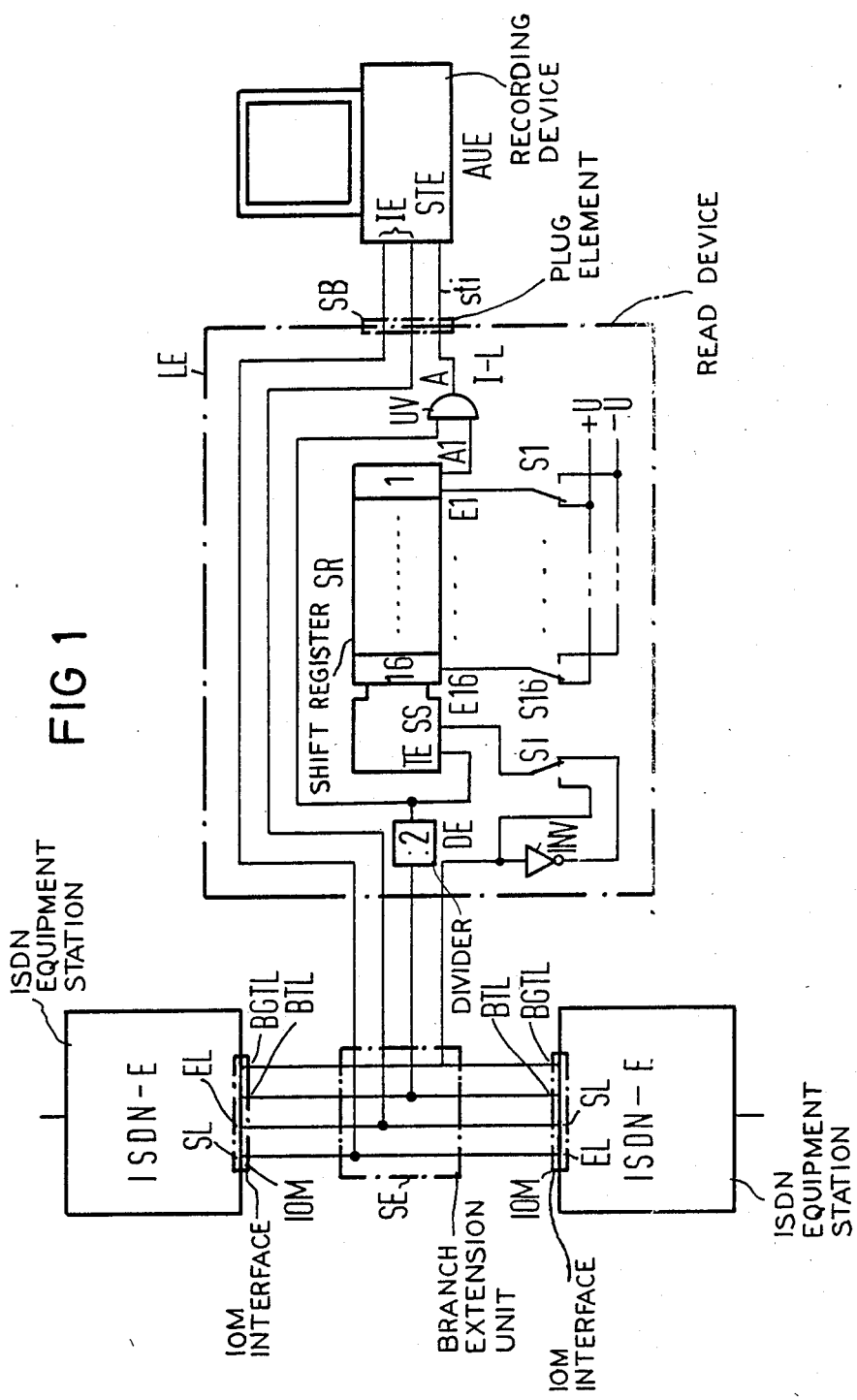

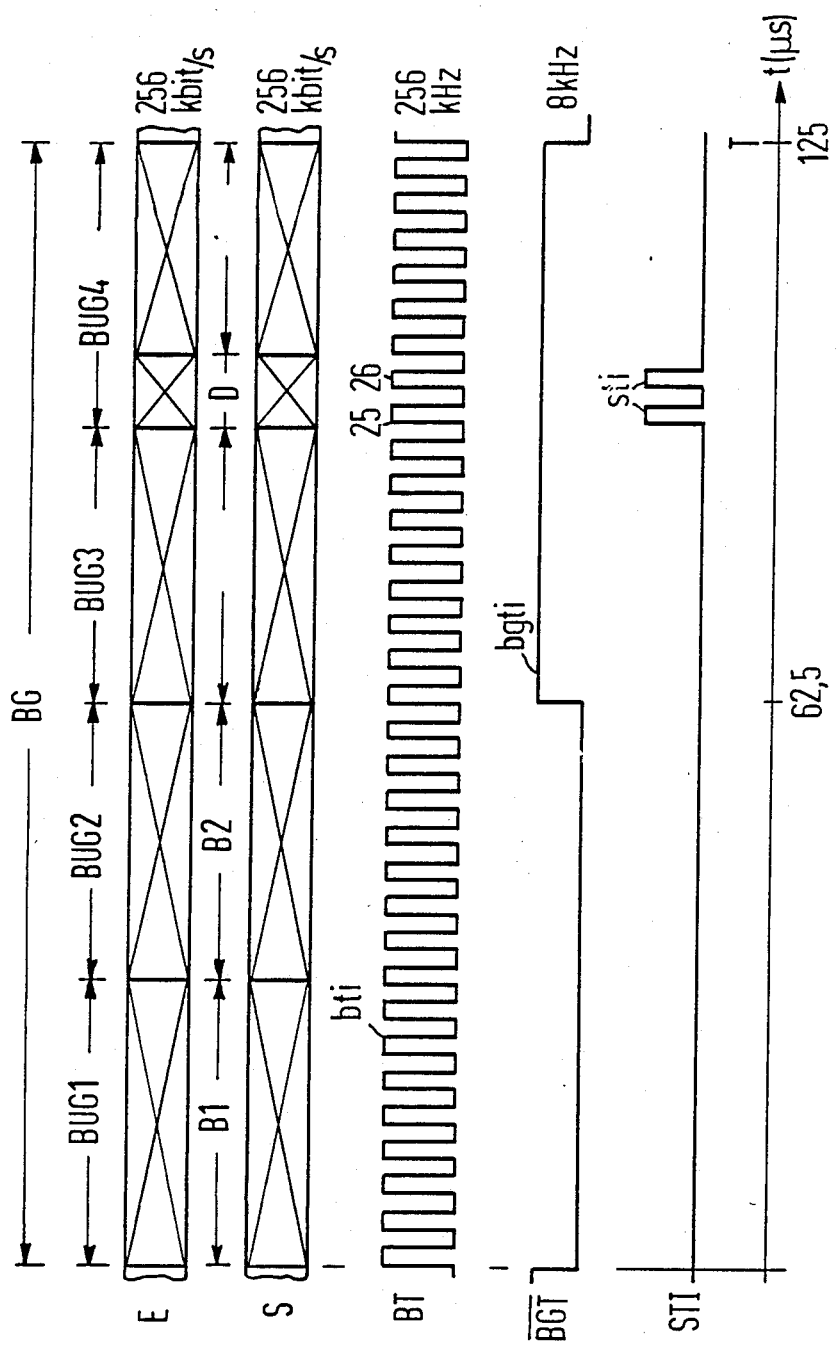

CIRCUIT ARRANGEMENT FOR DESIGNATIONAL READING OF INFORMATION OF A BIT GROUP ORIENTED, CONTINUOUS INFORMATION STREAM AT AN ISDN-ORIENTED INTERFACE

BACKGROUND OF THE INVENTION

1. Field of the Invention

The present invention relates to circuit arrangements for signalling the read points in time to a recording unit for designational reading of information contained in binary elements.

2. Description of the Prior Art

Integrated circuits are being developed and utilized to an increasing degree for system components such as, for example, subscriber and exchange equipment of ISDN telecommunications networks. These circuits, predominantly realized in mask etching technique, each contain complete function complexes of the system components. Such a function complex, for example, can be a transmission-oriented method with which the information are transmitted via the lines in the subscriber line region of an exchange equipment. Circuits, as well as a circuit design developed for ISDN system components, are shown and disclosed in the publication "Telecom Report" Vol. 9, No. 4, 1986, pp. 230-234. The circuit design is based on an "IOM Architecture", i.e. on an ISDN-oriented interface concept. This interface concept essentially contains a serial, internal data interface and an ISDN-oriented interface that is referred to below as an IOM interface. The IOM interface is formed with a respective receiving and data line by way of which the information are serially transmitted predominantly with a data rate of 256 Kbit/s as well as a respective bit group (frame) clock line having 8 KHz clock frequencies signals and a bit clock line having 512 KHz bit clock frequency signals. The bit group clock defines the limits of the bit groups each comprising 32 bits within the serial information stream. Furtermore, each bit group is sub-divided into 4 sub-groups of 8 bits each, whereby the first two bit sub-groups are each allocated to an information (B)-channel of an ISDN base terminal and the third sub-group contains a monitoring channel and the fourth bit sub-group contains the ISDN signaling (D)-channel, 2 bits, as well as an activation and access channel. The transmission of the communications information via the individual data links is monitored in the monitoring channel. The activation channel is provided for the activation or, respectively, deactivation of a circuit following the IOM interface by a preceding circuit. Access onto the monitoring channel is controlled via the access channel.

Since the IOM interface represents a central interface in the circuit concept and represents one of the few access points onto the information flow in the subscriber line region of an ISDN exchange equipment that is arranged outside of these circuits, there is a desire to co-read and record the information communicated via the IOM interface designationally, for example, only the signaling channel, or into, particularly in the case of fault or, respectively, malfunction. Recording equipment or, respectively, protocol testers and "logic analyzers" equipped with memory devices are already known for recording the information and these continuously read and store serially-existing information, information represented with TTL voltage levels as well.

SUMMARY OF THE INVENTION

An object of the present invention is to implement a designational reading of the information communicated via the IOM interface with the assistance of a simple circuit arrangement that can be realized with little expense, i.e. to determine the exact read points in time and to forward the same to a recording device with the assistance of a simple circuit arrangement.

Proceeding on the basis of the IOM interface initially set forth above, that is based on the ISDN concept, the above object is achieved, according to the present invention, in a circuit arrangement for determining the read points in time of a recording equipment for designational reading of information contained in binary elements or, respectively, bits in two serial, bit-oriented ISDN information signal streams respectively communicated via a receiving or, respectively, transmission line of an ISDN-oriented interface in which the ISDN information streams are formed with continuous exceeding bit groups, whereby each bit group comprises a prescribed plurality of bit sub-groups or, respectively, channels having a defined plurality of bits having defined informational contents, comprising a respectively additional clock line assigned to the ISDN-oriented interface and respectively comprising bit clock signals or, respectively, bit group clock signals, whereby the clock signals are communicated from one of the two ISDN equipment provided with the ISDN-oriented interfaces to the respective other and the ISDN information signal streams of the transmission or, respectively, receiving line have opposite transmission directions, which is particularly characterized in that a clock input of a shift register comprising a plurality of store locations matched to the plurality of bits of a bit group is additionally connected to the clock bit line carrying the bit clock signals. Furthermore, a set-shift input of the shift register is connected to the clock line carrying the bit group clock signals by way of a reset device generating a shift register reset signal on the basis of the bit group clock signals. The shift register comprises a plurality of parallel inputs corresponding to the plurality of storage locations and each of these parallel inputs is connectible by way of a switch device to a voltage potential representing the two binary conditions. The shift register output and the clock line carrying the bit clock signals are each fed to a respective input of an AND gate. The output of the AND gate and, additionally, the transmitting and receiving interface lines are connected to a recording device for the purpose of recording the informational contents of those bits of the bit groups or, respectively, bit sub-groups determined with the switch device.

The advantage that may be obtained in practicing the present invention is that a circuit arrangement is provided which is composed of few components and makes it possible to connect a recording device that reads and records the information of the IOM interface communicated via the receiving or, respectively, transmitting line at defined points in time to the IOM interface via appropriate contact devices.

One possibility of eliminating additional components is in utilizing a shift register whose number of storage locations corresponds to half the number of bits of a bit group in that the reset device is realized by an inverter in which the inverter is insertable into or, respectively, removable from the connection leading from the shift-set input to the clock line dependent upon the bit group for which the read points in time are determined. The reset device is thereby to be realized with an inverter, whereby the inverter is inserted or removed dependent upon the bit sub-group for which the read points in time are determined. This is a particularly simple solution in that the bit group frequency signals are present in a form given in which a reading in the first two bit groups is enabled by direct application of these signals to the shift-set input of the shift register. The designational selection of the bits to be read thereby occurs on the basis of appropriate setting of the switch device arranged at the parallel inputs. In order to enable a reading of the information bits in the respective third and fourth bit sub-groups, the bit group frequency signals merely have to be inverted with an inverter, whereby the designational selection of the information bits to be read again occurs on the basis of an appropriate setting of the same switch device previously employed. This inverter likewise represents a particularly simple embodiment of the invention that eliminates components, since, given utilization of a shift register whose number of registers corresponds to the number of bits of a bit group, a reset device is to be realized in such a manner that a differentiating and pulse-shaping device is formed with discrete components and with an integrated circuit with the object of generating a pulse at the beginning of each bit group that reads the voltage potentials applied at the parallel inputs of the the shift register. The structure mentioned above therefore achieves a halving of the number of storage locations in the shift register, a halving of the number of switch devices and a reduction of the number of components in the reset device, wherewith this embodiment of the invention is to be considered as being particularly advantageous. As already set forth, the realization of the halving structure with respect to the present invention allows a designational reading, either in the first two-bit sub-groups or in the third and fourth-bit sub-groups, i.e. does not allow a simultaneous reading in all four bit sub-groups. In the overwhelming majority of applications, i.e. malfunction of fault cases as well as development and testing of system components, the information contents of all or individual bits of one bit sub-group, for example of an information channel or of a signaling channel, are to be read, recorded and interpreted, wherewith this limitation remains restricted to few applications.

According to a particular feature of the invention, the invention is characterized in that the shift register is formed with serially-connected, edge-triggered J/K flip-flops.

According to another feature of the invention, the switch devices are realized by toggle switches.

According to another feature of the invention, the shift register, the reset device, the switch device and the AND gate are arranged in a separate reading device and that the connections to or, respectively, from the ISDN-oriented interface and the recording device are connected by way of pluggable or clampable equipment.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a circuit diagram of a circuit arrangement constructed in accordance with the present invention including its connection to the IOM interface and to the recording device; and FIG. 2 is a composite showing of flow charts in pulse diagrams for explaining the operation of the circuit arrangement of the invention.

DESCRIPTION OF THE PREFERRED EMBODIMENT

Referring to FIG. 1, two ISDN equipments, ISDN-E, are shown each of which is provided with an ISDN-oriented interface IOM. The two ISDN devices ISDN-E are realized in integrated circuit technology, for example, represent a transmission equipment comprising two-wire duplex transmission facilities and echo compensation, which is utilized in the subscriber line region of ISDN exchange equipment, and a communication protocol control element. Each of the two ISDN-oriented interfaces IOM is equipped with a receiving line EL and a transmitting line SL, as well as with a bit group clock line BGTL and a bit clock line BTL. The transmission line SL of an ISDN equipment ISDN-E is respectively fed to a receiving line EL of the opposite ISDN device ISDN-E by way of appropriate connections. The information present in basically digital signals are communicated via the receiving or, respectively, transmitting line EL, SL with a data rate of 256 Kbit/s. Bit clock frequency signals bti having a frequency of 512 KHz are transmitted via the bit clock line BTL and bit group clock frequency signals bgti having a frequency of 8 KHz are transmitted via the bit group clock line BGTL. For example, these frequency signals are emitted to the corresponding interfaces in the ISDN equipment ISDN-E containing the transmission technique and are communicated to the opposite ISDN equipment ISDN-E. The frequency signals can likewise be emitted by the ISDN equipment ISDN-E that contains the communication protocol control. Which equipment then generates, forwards, or, respectively, emits these frequency signals essentially depends on the region of an ISDN subscriber line region of an exchange in which the ISDN equipment ISDN-E are arranged. When, for example; the ISDN equipment ISDN-E are arranged in subscriber equipment, then the frequency signals are derived from the information signals incoming to the subscriber equipment, i.e. in the ISDN equipment ISDN-E that contains the transmission procedure. By way of example, it is assumed that a branch extension plug unit SE is inserted into the connections between the two ISDN-oriented interfaces IOM. This branch extension SE can be arranged either directly on an assembly or on the front motherboard thereby making it, therefore easily externally accessible. For reasons of clarity in the block circuit diagram, the required ground potential connections or, respectively, 0 volt connections between both the two ISDN equipments ISDN-E, as well as in the circuit arrangement set forth below, are not shown in FIG. 1. The receiving line and transmitting line EL, SL are fed from the branch extension SE and by way of appropriate lines to the information inputs IE of a recording device AUE either directly (not shown since this is a further alternative) or via a read device LE. All information that is exchanged between the two ISDN equipment stations ISDN-E therefore proceed to the information inputs IE of the recording device AUE. The bit clock line BTL is likewise fed by way of the branch extension unit SE to an input of a divider DE, and the output of the divider DE is fed to a clock input TE of a shift register SR as well as to a first input of an AND gate UV. Both the shift register SR and the AND gate UV are arranged in the read device LE, for example on the printed circuitboard. The bit group clock line BGTL is, in turn, connected via the branch extension unit SE to an inverter INV arranged in the read device LE and to a first switch contact of a toggle switch SI. The output of the inverter INV is fed to a second terminal of the toggle switch SI. The middle contact of the toggle switch SI is connected to a shift-set input SS of the shift register SR. The shift register SR is formed by 16 serially-connected, edge-triggered registers or, respectively, J/K flip flops. Such a shift-register SR, for example, is realized with two serially-connected, integrated low-power Schottky circuits 74LS166 (8 bit shift register having parallel input and reset input). One input E1-E16 of the shift register SR is respectively fed to a middle contact of a toggle switch S1-S16. Both of all first switch contacts, as well as all second switch contacts of the toggle switches S1-S16 are respectively connected to one another.

All first switch contacts of the toggle switches S1-S16 are connected to a voltage source +U that has a voltage potential representing the logical "1" condition of TTL technology and all second switch contacts of the toggle switches S1-S16 are connected to a voltage source −U that has the voltage potential representing the "0" condition. The output A1 of the flip-flop arranged last in the register chain or, respectively, the output of the shift register SR, is fed to a second input of the AND gate UV by way of an appropriate connection. The output A of the AND gate UV is connected by way of a plug element SB to the control input STE of a recording device AUE. Such a plug element can be arranged both at the reading equipment LE and, alternatively, at the recording equipment AUE (not shown in detail).

The circuit arrangement of FIG. 1 shall be set forth in greater detail below with the assistance of the pulse-time diagram illustrated in FIG. 2. The diagrams show the pulse sequences within a time segment of 125 μs. The time of 125 μs indicates the period T of the bit group clock signal bgti and, therefore, the time duration of a bit group BG. The first two diagrams referenced E and S schematically illustrate the subdivision of a bit group BG into bit subgroups BUG. A bit group BG covers 32 bits, as a result of which a plurality of 8 bits derives for each bit subgroup BUG. Although the bit group BG is shown divided into four subgroups of eight bits each, it may be recognized by those skilled in the art that each bit group could have similarly been divided into two subgroups of 16 bits each. In either case, the term "subgroup" is appropriate, since it refers to the division of the bit group into smaller units. The first bit group BUG1 and the second bit group BUG2 each represent an information channel B of an ISDN subscriber terminal. The third bit subgroup BUG3 contains the aforementioned monitoring channel. As likewise already set forth above, the fourth bit subgroup BUG4 has an activation channel, an access channel and a signaling channel assigned thereto. By way of example, it is assumed that the recording device AUE is to read and record the information of the signaling channel D that comprises two bits. The following trace BT shows the 32 bit clock pulses that are assigned to a respective bit group BG after a halving of the 512 KHz bit clock frequency in the divider DE. It may be seen from this bit clock pulse diagram that the information in the signaling channel are communicated with the 25th and 26th bit clock pulses bti.

It is then the goal of the circuit arrangement of the invention to generate two identical pulses that are present at the same time in addition to the 25th and 26th bit clock pulses, these two pulses being transmitted to the recording device AUE and informing the latter that it must read and record the information of the transmitting and receiving lines SL, EL at exactly these times. Since the information of the signaling channel D are arranged in the fourth bit subgroup BUG4, the bit group clock signals bgti are fed to the shift-set input SS of the shift register SR via the inverter INV by the corresponding set inverting switch SI. A voltage potential representing the logical "0" is therefore applied at the shift-set input SS of the shift register SR during the first 16 bit clock pulses bti, as may be seen in the fourth line of FIG. 2 referenced bgt. At each positive signal edge change of the bit clock signals bti applied at the clock input TE, the logical voltage potentials +U, −U set at the flip-flop inputs E1-E16 by the toggle switches S1-S16 are thereby read into and stored in the respective flip-flops. When, after 16 bit clock pulses bti, the voltage potential at the shift-set input SS changes to a voltage potential +U representing the logical "1", then, at each positive edge of the bit clock signals bti applied at the clock input TE, the stored, logical voltage potentials +U, −U are transmitted or, respectively, shifted by one register position i.e. by one flip-flop in the direction of the shift register output A1. The toggle switches S1-S16 are to be set such that voltage potential +U representing the logical "1" is applied at the output A1 of the shift register SR1 during the 25th and 26th bit clock pulse bti. Since, proceeding from the 17th bit of a bit group BG, which represents the beginning of the third bit subgroup BUG3, the signaling bits appear at the 9th and 10th bits, the 9th and 10th trigger switches S9, S10 are therefore to be set such that a voltage potential +U representing the logical "1" proceeds to the 9th and 10th inputs E9, E10 of the shift register SR. The remaining toggle switches are to be set such that a voltage potential −U representing the logical "0" is applied at the inputs E of the shift register SR. As a consequence of the selected trigger settings of the switches S1-S16, a voltage potential representing the logical "1" is applied during the 25th and 26th bit clock pulses at the second input of the AND gate UV connected to the shift register output A1. Simultaneously, the serial bit clock pulses bti, also the 25th and 26th clock pulses bti, are applied at the first input of the AND gate UV. As a result of the logical AND operation, the 25th and 26th bit clock pulses bti are fed to the output A thereof in the AND gate UV. These two pulses, referred to as control pulses sti in the fifth line of FIG. 2 and referenced STI, proceed via the corresponding connection to the control input STE of the recording device AUE. These two control pulse sti inform the recording device AUE of the points in time at which it is to read and store the information on the receiving and transmitting lines EL, SL. The negative signal edges of the control pulses sti which represent roughly the middle of the period duration of an information pulse, can be defined in the recording device AUE as accurate sampling points in time of the information. All protocol testers and "logic analyzers" come into consideration as recording devices AUE that comprise a plurality of information inputs IE and at least one control input STE and a function for reading and recording on demand. Most commercially-available recording devices AUE are equipped with such an extremely simple, basic function.

Although we have described our invention by reference to a particular illustrative embodiment thereof, many changes and modifications of the invention may be apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for generating signals corresponding to the read points in time necessary to allow a recording unit to designationally read information contained in two serial, bit-oriented ISDN information signal streams respectively transmitted via communication lines of first and second ISDN-oriented interfaces respectively disposed in first and second ISDN equipment stations, said first and second ISDN-oriented interfaces facilitating communication between said first and second ISDN equipment stations, each of said two serial, bit-oriented ISDN information signal streams formed as a continuous sequence of bit groups, each bit group having a prescribed plurality of bits arranged in sub-groups or channels having a defined plurality of bits with a defined information content, said first ISDN-oriented interface providing a bit clock signal and a bit group clock signal to said second ISDN-oriented interface, said arrangement comprising:
   a shift register having a clock input and a plurality of storage locations respectively dedicated to said prescribed plurality of bits of a bit group, said shift register further having a shift-set input connected to receive said bit group clock signal;
   reset means connecting said shift-set input to said bit group clock signal and operable to generate a shift register reset signal from said bit group clock signal;
   said shift register further having a plurality of parallel inputs corresponding to said plurality of storage locations, each of said parallel inputs being connectible to a voltage potential representing two binary conditions;
   switch means connecting said inputs to said voltage potential;
   an AND logic gate connected to receive said shift register output and said bit clock signal, said AND logic gate having an output; and
   a recording unit connected to said output of said AND gate for recording the informational contents of those bits of the bit determined by said switch means.

2. The arrangement of claim 1, wherein said storage locations of said shift register correspond in number to half the number of bits of a bit group, and wherein said reset means comprises an inverter and a switch, whereby said inverter is insertable into or removable from said connection from said shift-set input to said clock line dependent on the bit group for which the read points in time are to be determined.

3. The arrangement of claim 2, wherein two ISDN information channels are provided, one ISDN signaling channel and a monitoring telemetry channel are assigned to the bit groups.

4. The arrangement of claim 3, wherein said shift register comprises serially-connected, edge-triggered J/K flip-flops.

5. The arrangement of claim 4, wherein said switch means are toggle switches.

6. The arrangement of claim 5, wherein said shift register, said reset means, said switch means and said AND logic gate are arranged in an equipment housing as a single unit, all connections to or from the ISDN-oriented interface and said equipment housing connected thereto via releasable connections.

7. An apparatus for generating control signals coincident with designated data bits in a serial ISDN information stream transmitted between two ISDN-oriented interfaces respectively disposed in two communicating ISDN equipment stations, said serial ISDN information stream formed as a continuous sequence of bit groups, each bit group having a prescribed plurality of bit subgroups each having a defined plurality of bits, one of said two ISDN-oriented interfaces providing a bit clock signal at a first clock rate and a bit group clock signal at a second clock rate, said signals coincident with said designated data bits being used by a recording unit, said apparatus comprising:
   a shift register having a clock input, a shift-set input, and a plurality of storage locations equal in number to said defined plurality of bits in a single bit subgroup of said prescribed plurality of bit sub-groups, said storage locations each having a respective input;
   shift control means responsive to said bit group clock signal and said bit clock signal for generating a first signal from said bit clock signal coincident with all data bits in said serial ISDN information stream, said first signal supplied to said clock input of said shift register, and for generating a second signal from said bit group clock signal coincident with an occurrence of a bit-subgroup having said designated data bits, said second signal supplied to said shift-set input of said shift register;
   switch means for selectively supplying logic level signals to each of said respective inputs of said storage locations, said logic level signals having a first and second state, said first logic state selectively supplied to said respective inputs corresponding to bit positions of said designated data signals in said bit-subgroup having said data bits, said shift register means shifting said logic level signals to an output of said shift register means in response to said first and second signals supplied from said shift control means; and
   coincidence detection means for generating said control signals to said recording unit in response to coincidence between said first signal and an occurrence of said first logic level at said output of said shift register.

8. An apparatus as recited in claim 7, wherein said shift control means comprises dividing means for generating said first signal by dividing said first clock rate of said bit clock signal.

9. An apparatus as recited in claim 7, wherein said shift control means comprises:
   an inverter having an input receiving said bit group clock signal and an output;
   a toggle switch having a first terminal connected to said output of said inverter, a second terminal connected to said bit group clock, and a pole connected to said shift-set input of said shift register.

10. An apparatus as recited in claim 9, wherein said shift control means further comprises dividing means for generating said first signal by dividing said first clock rate of said bit clock signal.

11. An apparatus as recited in claim 7, wherein said switch means comprises a plurality of toggle switches each having a first terminal connected to a first voltage source corresponding to said first logic level, a second terminal connected to a second voltage corresponding to said second logic level, and a pole terminal connected to a respective input of one of said storage locations.

12. An apparatus as recited in claim 7, wherein said shift register comprises serially-connected, edge-triggered J/K flip-flops.

13. An apparatus as recited in claim 7, wherein said coincidence detection means comprises an AND gate having a first input connected to said output of said shift register, a second input connected to said first control signal of said shift control means, and an output supplied to said recording unit.

14. An apparatus for generating control signals coincident with designated data bits in a serial ISDN information stream transmitted between two ISDN-oriented interfaces respectively disposed in two communicating ISDN equipment stations, said serial ISDN information stream formed as a continuous sequence of bit groups, each bit group having a prescribed plurality of bits arranged in sub-groups, one of said two ISDN-oriented interfaces providing a bit clock signal at a first clock rate and a bit group clock signal at a second clock rate, said signals coincident with said designated data bits being used by a recording unit, said apparatus comprising:

a shift register having a clock input, a shift-set input, and a plurality of storage locations equal in number to said prescribed plurality of bits in a single bit group, said storage locations each having a respective input;

shift control means responsive to said bit group clock signal and said bit clock signal for generating a first signal from said bit clock signal coincident with all data bits in said serial ISDN information stream, said first signal supplied to said clock input of said shift register, and for generating a second signal from said bit group clock signal coincident with an occurrence of a bit group having said designated data bits, said second signal supplied to said shift-set input of said shift register;

switch means for selectively supplying logic level signals to each of said respective inputs of said storage locations, said logic level signals having a first and second state, said first logic state selectively supplied to said respective inputs of said storage locations corresponding to bit positions of said designated data signals in said bit group, said shift register means shifting said logic level signals to an output thereof in response to said first and second signals supplied from said shift control means; and coincidence detection means for generating said control signals to said recording unit in response to coincidence between said first signal and an occurrence of said first logic level at said output of said shift register.

15. An apparatus as recited in claim 14, wherein said shift control means comprises dividing means for generating said first signal by dividing said first clock rate of said bit clock signal.

16. An apparatus as recited in claim 14, wherein said switch means comprises a plurality of toggle switches each having a first terminal connected to a first voltage source corresponding to said first logic level, a second terminal connected to a second voltage corresponding to said second logic level, and a pole terminal connected to a respective input of one of said storage locations.

17. An apparatus as recited in claim 14, wherein said shift register comprises serially-connected, edge-triggered J/K flip-flops.

18. An apparatus as recited in claim 14, wherein said coincidence detection means comprises an AND gate having a first input connected to said output of said shift register, a second input connected to said first control signal of said shift control means, and an output supplied to said recording unit.

* * * * *